(12) United States Patent
Mancarella et al.

(10) Patent No.: US 9,366,598 B2
(45) Date of Patent: Jun. 14, 2016

(54) METHOD FOR TESTING A HYDROSTATIC TRANSMISSION

(71) Applicant: CNH Industrial America LLC, New Holland, PA (US)

(72) Inventors: Francesco Mancarella, Brindisi (IT); Gabriele Morandi, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 216 days.

(21) Appl. No.: 14/358,791

(22) PCT Filed: Nov. 13, 2012

(86) PCT No.: PCT/EP2012/072504
§ 371 (c)(1),
(2) Date: May 16, 2014

(87) PCT Pub. No.: WO2013/072315
PCT Pub. Date: May 23, 2013

(65) Prior Publication Data
US 2014/0326060 A1    Nov. 6, 2014

(30) Foreign Application Priority Data

Nov. 18, 2011  (IT) .............................. MO2011A0296

(51) Int. Cl.
| | | |
|---|---|---|
| *G01M 13/02* | (2006.01) | |
| *F16H 61/4192* | (2010.01) | |
| *F16H 59/68* | (2006.01) | |
| *F16H 59/16* | (2006.01) | |
| *B60W 50/04* | (2006.01) | |

(52) U.S. Cl.
CPC ........... *G01M 13/02* (2013.01); *F16H 61/4192* (2013.01); *B60W 2050/043* (2013.01); *F16H 59/16* (2013.01); *F16H 2059/6869* (2013.01); *F16H 2059/6876* (2013.01); *F16H 2059/6884* (2013.01)

(58) Field of Classification Search
CPC .................... F16H 61/4192; F16H 2059/6869; F16H 2059/6876; F16H 2059/6884; F16H 59/16; B60W 2050/043; G01M 13/02
USPC ......................................... 73/115.02
See application file for complete search history.

(56) References Cited

U.S. PATENT DOCUMENTS

| | | | | |
|---|---|---|---|---|
| 7,360,458 B2* | 4/2008 | Heinzelmann | .......... | F16H 59/16 701/61 |
| 7,920,949 B2* | 4/2011 | Kuras | .................. | F16H 61/4192 477/37 |
| 8,020,659 B2* | 9/2011 | Schultz | .............. | B60W 10/103 180/301 |
| 8,118,132 B2* | 2/2012 | Gray, Jr. | .................. | B60K 6/12 180/305 |
| 9,157,527 B2* | 10/2015 | Thorell | ............... | F16H 61/4096 |
| 9,227,618 B2* | 1/2016 | Francesco | ........... | F16H 61/4192 |
| 2006/0225520 A1* | 10/2006 | Heinzelmann | ........ | G01L 3/1464 73/862.326 |
| 2008/0093152 A1* | 4/2008 | Gray | ....................... | B60K 6/12 180/307 |
| 2008/0294318 A1* | 11/2008 | Kuras | .................. | F16H 61/4192 701/56 |
| 2009/0133951 A1* | 5/2009 | Schultz | .............. | B60W 10/103 180/307 |
| 2012/0123661 A1* | 5/2012 | Gray, Jr. | .................. | B60K 6/12 701/99 |

\* cited by examiner

*Primary Examiner* — Freddie Kirkland, III
(74) *Attorney, Agent, or Firm* — Sue C. Watson

(57) ABSTRACT

A method for testing a transmission of a vehicle, the transmission including a hydrostatic unit installed on the vehicle. The method includes calculating an actual value of a parameter which is indicative of the volumetric efficiency of the hydrostatic unit, in a working condition. The method also includes determining an expected value of the parameter in the working condition. The actual value is comparable with the expected value in order to evaluate how the hydrostatic unit is working.

13 Claims, 5 Drawing Sheets

METHOD FOR TESTING A HYDROSTATIC TRANSMISSION

CROSS REFERENCE TO RELATED APPLICATIONS

This application is the US National Stage filing of International Application Serial No. PCT/EP2012/072504, entitled "A METHOD FOR TESTING A HYDROSTATIC TRANSMISSION" filed Nov. 13, 2012, which claims priority to Italian Application Serial No. MO2011A000296, filed Nov. 18, 2011, each of which is incorporated by reference herein in its entirety for all purposes.

FIELD OF THE INVENTION

The invention relates to a method for testing a hydrostatic transmission of a vehicle, particularly a working vehicle such as a tractor, an excavator, a crawler vehicle or the like. The method according to the invention tests the hydrostatic transmission on the basis of the volumetric efficiency thereof.

BACKGROUND OF THE INVENTION

Tractors are known which comprise a continuously variable transmission (CVT) for transmitting a torque from an internal combustion engine to a driving axle and hence to the wheels. Known continuously variable transmissions may comprise a hydrostatic transmission including a hydrostatic unit. The latter in turn comprises a variable displacement hydraulic pump connected to a hydraulic motor. By varying the displacement volume of the hydraulic pump, the torque applied to the wheels can be set to the desired value. A control device, comprising for example an electro-valve, is provided for controlling the hydraulic unit. It may happen that, during life of a tractor, the hydraulic transmission does not work properly. In this case, it is not easy to understand which component of the hydrostatic transmission causes the problem. In other words, it is not easy to understand whether there is a fault either in the hydrostatic unit, or in the electro-valve, or in any other component.

Therefore, in order to quickly repair the tractor, the whole hydrostatic unit is often removed and replaced by a new hydrostatic unit. This is a very expensive way of obviating the fault, especially if it is later discovered that the removed hydrostatic unit was actually working properly and that the malfunctioning was due to another component.

An object of the invention is to improve known vehicles, particularly working vehicles such as wheeled or crawler tractors and excavators.

Another object is to avoid removing a hydrostatic unit from the vehicle in a case in which the hydrostatic unit is actually working properly.

A further object is to minimize costs and time required by maintenance and repairing operations of a vehicle.

SUMMARY OF THE INVENTION

According to the invention, there is provided a method for testing a hydrostatic transmission of a vehicle, the hydrostatic transmission comprising a hydrostatic unit installed on the vehicle, the method comprising the following steps:

calculating an actual value of a parameter which is indicative of the volumetric efficiency of the hydrostatic unit, in a working condition;

determining an expected value of said parameter in said working condition, said actual value being comparable with said expected value in order to evaluate how the hydrostatic unit is working.

Owing to the invention, it is possible to evaluate quality of the hydrostatic unit and thus establish, for example, whether the hydrostatic unit needs to be repaired without disassembling the hydrostatic unit from the vehicle. As a consequence, a hydrostatic unit can be removed from the vehicle only if the hydrostatic unit actually exhibits a fault. It is therefore possible to avoid dismounting hydrostatic units which are then found to work properly.

This allows time and costs to be considerably saved.

BRIEF DESCRIPTION OF THE DRAWINGS

The invention will be better understood and carried out with reference to the attached drawings, which show an exemplificative and non-limitative embodiment thereof, in which.

DETAILED DESCRIPTION OF THE INVENTION

Figure 1:
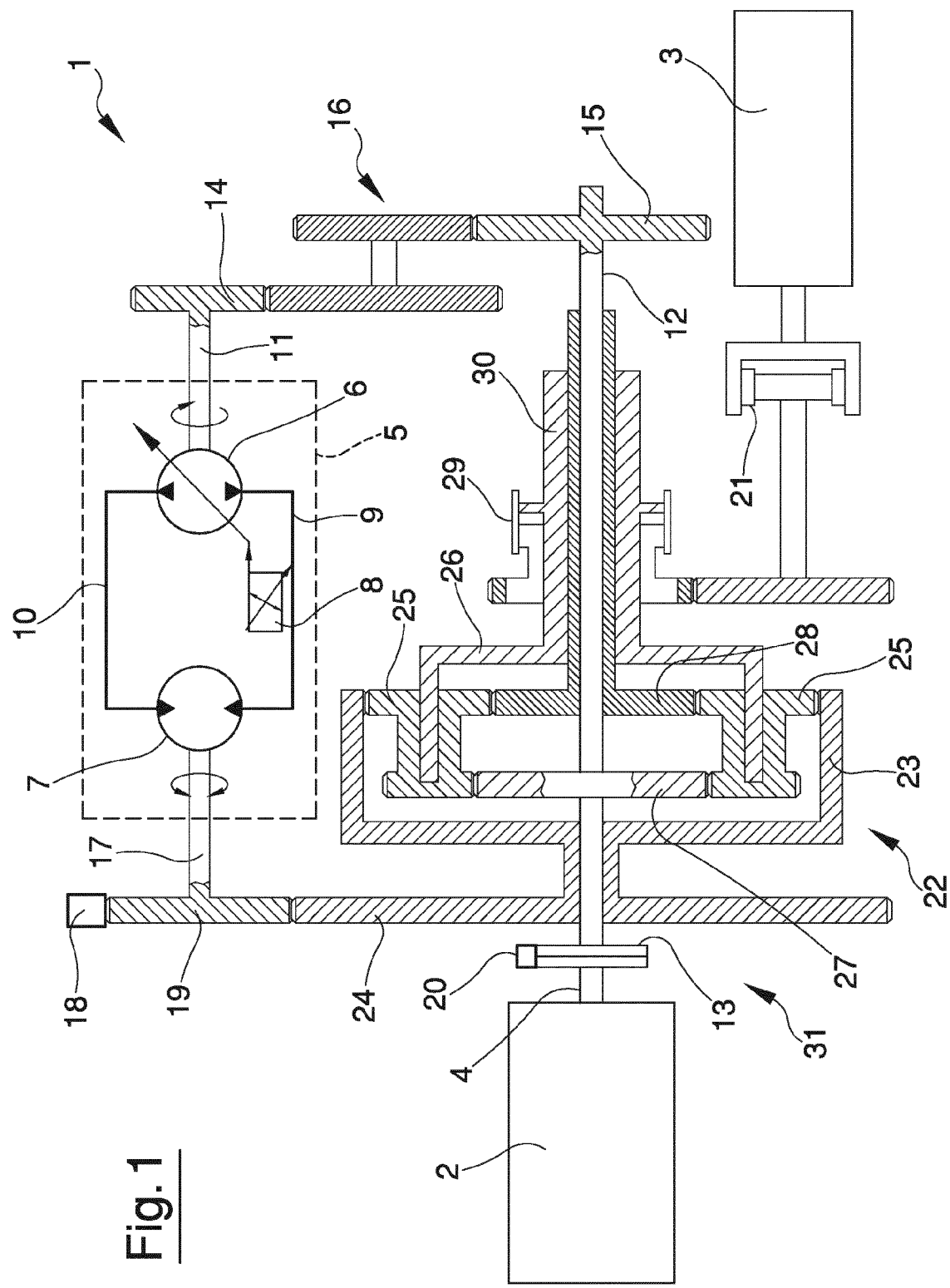
FIG. 1 is a schematic drawing showing a transmission system of a vehicle.

FIG. 1 shows a transmission system 1 for transmitting power between an engine 2 and a driving axle of a vehicle.

The vehicle in which the transmission system 1 is inserted can be a working vehicle, such as a wheeled tractor, a crawler vehicle, an excavator or the like.

In the embodiment shown in FIG. 1, the vehicle which incorporates the transmission system 1 is a wheeled tractor having wheels mounted on the driving axle. These wheels have been schematically represented as a rectangle in FIG. 1 and are designated by the reference numeral 3.

It is however intended that what will be explained herebelow is applicable also to crawler vehicles, in which case the driving axle will move a pair of driving sprockets of respective tracks.

The engine 2 can be an internal combustion engine, particularly a diesel engine.

The transmission system 1 comprises a continuously variable transmission (CVT) interposed between the engine 2 and the wheels 3. The continuously variable transmission comprises a hydrostatic transmission including a hydrostatic unit 5, whose outline has been shown schematically by a dashed line in FIG. 1. The hydrostatic unit 5 in turn comprises a hydraulic pump 6 and a hydraulic motor 7 so configured as to be driven by the hydraulic pump 6.

The hydraulic pump 6 can be a variable displacement pump. In particular, the hydraulic pump 6 can be an axial pump and can comprise a swash plate cooperating with a plurality of axial pistons.

An adjusting device 8 is provided for adjusting the position of the swash plate, i.e. for adjusting the swivel angle of the swash plate and consequently the displacement volume of the hydraulic pump 6. The adjusting device 8 can comprise, for example, an electro-valve.

The hydraulic pump 6 and the hydraulic motor 7 are connected to one another by means of a first line 9 and a second line 10. A hydraulic fluid can be sent from the hydraulic pump 6 to the hydraulic motor 7 through the first line 9. In this case, the hydraulic fluid comes back from the hydraulic motor 7 to the hydraulic pump 6 through the second line 10. The first line 9 is therefore a high-pressure line, whereas the second line 10 is a low-pressure line, because the pressure of the hydraulic fluid in the first line 9 is higher than the pressure of the hydraulic fluid in the second line 10.

If however the rotation direction of a shaft of the hydraulic pump 6 is inverted, while all the other working conditions remain unchanged, the hydraulic fluid can also be sent from the hydraulic pump 6 to the hydraulic motor 7 through the second line 10, and come back to the hydraulic pump 6 through the first line 9. The first line 9 is in this case a low-pressure line, whereas the second line 10 is a high-pressure line.

A damping assembly 31 is provided for connecting an engine shaft 4 of the engine 2 to a transmission shaft or main shaft 12 of the transmission system 1. The engine shaft 4 acts as a driving shaft since it rotatingly drives the main shaft 12 through the damping assembly 31. The engine shaft 4 can be a crankshaft of the engine 2.

The damping assembly 31 serves for deflecting and thus absorbing the power pulses generated by the engine 2, so that torque delivered to the main shaft 12 is more constant over an engine cycle.

The damping assembly 31 may comprise a first rotatable element connected to the engine shaft 4 and a second rotatable element connected to the main shaft 12. The second rotatable element can be a damper 13, for example comprising a plurality of resilient elements acting in a circumferential direction to exert a damping action.

The first rotatable element could be, for example, a flywheel.

More detailed information concerning the structure of the damper 13 can be found in EP 0741286, which relates to a mechanical damper. In the alternative, other kinds of damper could be used, for example a viscous damper.

The hydraulic pump 6 has an input shaft 11 that is mechanically connected to the engine 2, so that the input shaft 11 can be rotatingly driven by the engine 2. If the input shaft 11 is rotated while the swash plate of the hydraulic pump 6 is in a swiveled configuration, energy is transmitted from the hydraulic pump 6 to the hydraulic motor 7.

The input shaft 11 can be connected to the engine 2 via a mechanical connection comprising, for example, a toothed wheel 14 fixed relative to the input shaft 11. The toothed wheel 14 engages with a further toothed wheel 15 which is fixed relative to the main shaft 12.

An intermediate gear 16 can be interposed between the toothed wheel 14 and the further toothed wheel 15.

The hydraulic motor 7 has an output shaft 17 suitable for being rotated when the hydraulic fluid is sent into the hydraulic motor 7.

A sensor 18 is provided for measuring the speed of the output shaft 17, particularly the rotational speed thereof. The sensor 18 can be associated to a cogwheel 19 fixed relative to the output shaft 17, so that the sensor 18 is adapted to measure the rotational speed of the cogwheel 19 and hence of the output shaft 17.

A detector 20 is provided for detecting one or more working parameters of the main shaft 12, particularly at the damper 13. The detector 20 can be configured for detecting torque transmitted to the main shaft 12 by the damper 13.

A control device which is not shown is provided for controlling the engine 2. The control device is capable of monitoring several working parameters of the engine 2, for example torque and rotational speed of the engine shaft 4.

A clutch 21 allows the wheels 3 to be selectively connected to, or disconnected from, the engine 2.

A mechanical transmission device is interposed between the engine 2 and the clutch 21. In the embodiment shown in FIG. 1, the mechanical transmission device comprises a planetary gearing 22.

The planetary gearing 22 comprises an annulus or outer ring 23 capable of being rotated by the output shaft 17 of the hydrostatic transmission. To this end, the outer ring 23 may be fixed relative to an intermediate toothed wheel 24 arranged to engage with the cogwheel 19.

The planetary gearing 22 further comprises a plurality of planet gears 25 supported by a planet carrier 26.

The planetary gearing 22 further comprises a sun gear 27 which can be fixed relative to the main shaft 12. A further sun gear 28 is also provided, which can engage with the planet gears 25.

Power can be transmitted to the wheels 3 alternatively via the planet carrier 26 or via the further sun gear 28, in which case the planet carrier 26 is left free to rotate.

A synchronizing device 29 is interposed between the planetary gearing 22 and the clutch 21 for allowing a smooth engagement of the gears of the transmission system 1.

More than one synchronizing device can be present, although they have not been shown since they are not relevant for performing the method that will be disclosed below. For example, a further synchronizing device that is not shown can be associated to a tubular element 30 fixed relative to the further sun gear 28.

Torque generated by the engine 2 is split into two torque fractions which reach the planet gears 25 through two different input torque paths. A first input torque path goes from the engine 2 to the main shaft 12 via the engine shaft 4, then to the hydrostatic unit 5 through the toothed wheels 14, 15 and finally to the outer ring 23 of the planetary gearing 22 through the cogwheel 19 and the intermediate toothed wheel 24. A second input torque path goes from the engine shaft 4 to the planet carrier 26 through the main shaft 12 and the sun gear 27. The two input torque paths join to one another at the planet gears 25.

Torque exits from the planetary gear through two alternative output torque paths. The first output torque path passes through the planet carrier 26, the tubular element 30 and the synchronizing device 29. The second output torque path goes from the further sun gear 28 to the further synchronizing device that is not shown.

In an alternative embodiment, only one torque path can be provided for transmitting torque through the planetary gearing 22.

Figure 2:
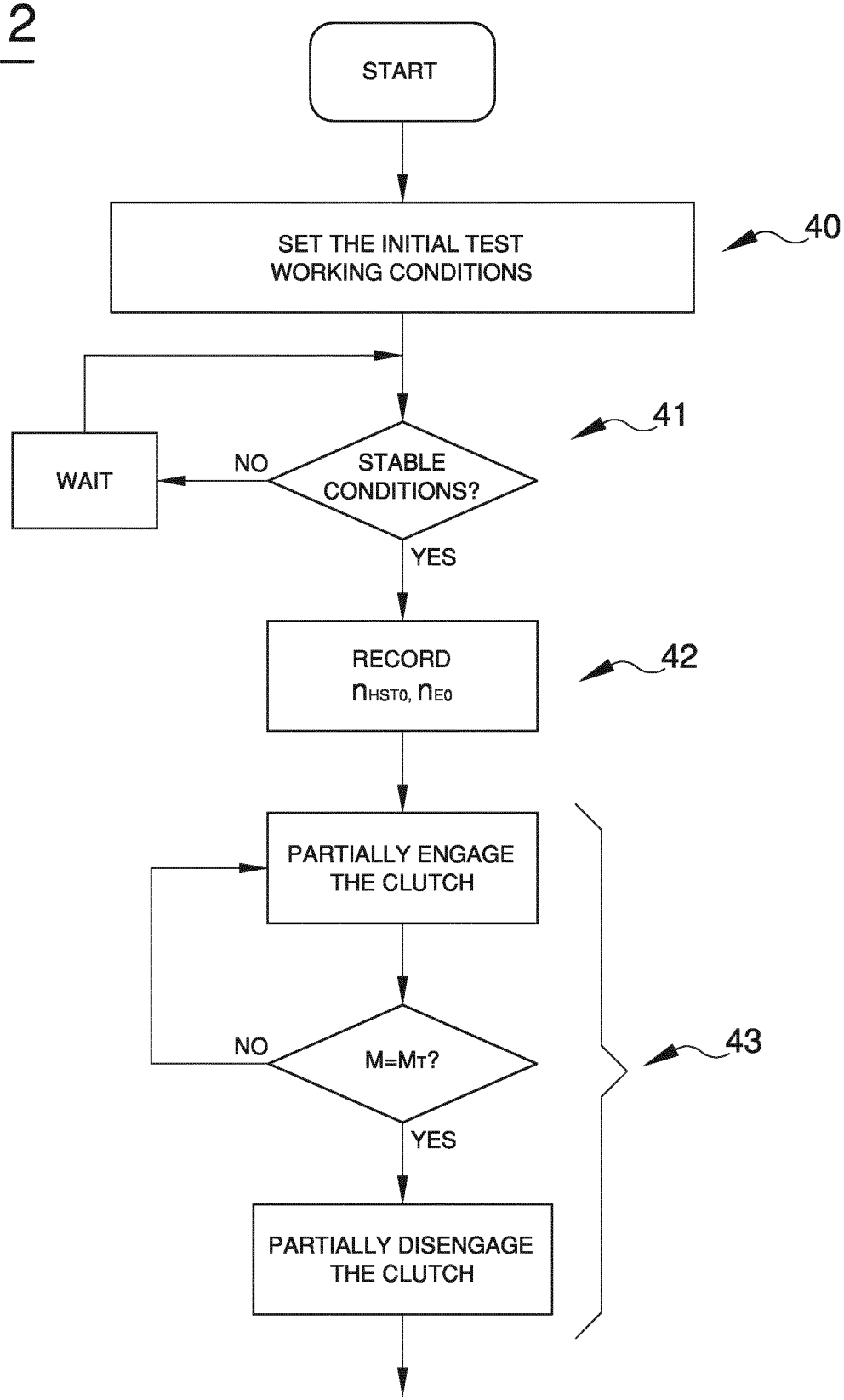
FIG. 2 is the first part of a block diagram showing the steps of a method for testing a hydrostatic transmission of the transmission system of FIG. 1.
Figure 3:
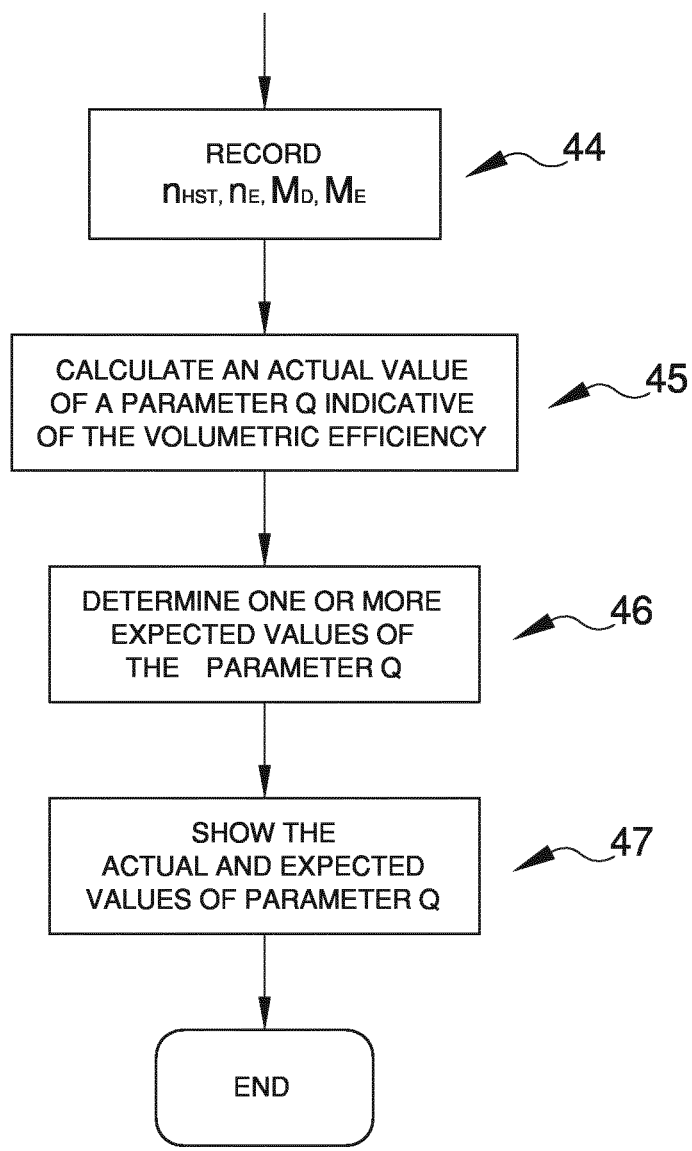
FIG. 3 is the second part of the block diagram of FIG. 2.

FIGS. 2 and 3 show the steps of a testing method for testing the hydrostatic transmission while the hydrostatic unit 5 is still installed on the vehicle. The testing procedure can be used particularly if a fault in the hydrostatic unit 5 is suspected, in order to check whether the hydrostatic unit 5 needs to be replaced or not. More in general, by means of the testing procedure it is possible to evaluate how the hydrostatic unit 5 is working, i.e. which is the quality of the hydrostatic unit 5.

The vehicle to be tested is kept still. To this end, it is possible to activate a hand brake of the vehicle, so that any movement of the vehicle is prevented.

For safety reasons, the vehicle is resting on a flat surface.

First of all, there is provided a setting step in which the vehicle is set in a test configuration by setting certain working parameters to a predefined value. The setting step is indicated by the reference numeral 40 in FIG. 2.

In the setting step 40, the engine 2 is started and its rotational speed is set to a determined test value. This test value should not be too low in order to have sufficient torque, nor should it be too high in order to avoid wasting power. For example, for the vehicles that have been studied, the test value of the rotational speed of engine 2 could be between 1000 and 1500 rpm. Furthermore, a desired value of the swivel angle of the swash plate in the hydraulic pump 6 is selected. The selected value of the swivel angle can be expressed by the parameter α, which is equal to the ratio between the current value of the swivel angle and the maximum possible value of the swivel angle. The parameter α can vary between −1 and +1.

In the embodiment that will be described below, the parameter α has been set to +1. In other words, the swash plate of the hydraulic pump 6 has been positioned in its most tilted configuration. This is done by sending a high current to the adjusting device 8, particularly to the corresponding electro-valve, so that the swash plate is swiveled in its most tilted configuration.

It has been experimentally found that, in this way, the swash plate can be kept in a stable position for the whole duration of the testing procedure, by simply saturating current sent to the electro-valve of the adjusting device 8 until the testing procedure is completed.

In principle, however, it is also possible to use different values of α, particularly α=−1.

By setting α to a desired value, the ratio between the output speed and the input speed of the hydrostatic unit 5, i.e. the ratio between the rotational speed of the output shaft 17 and of the input shaft 11 is univocally determined, for a given hydrostatic unit and for given pressure conditions.

In the setting step 40, the synchronizing device 29 is also engaged and set in a desired position, depending on the kind of vehicle to be tested. For example, the synchronizing device 29 can be so positioned as to select a first forward gear.

The clutch 21 is open, i.e. completely disengaged.

A calibration procedure can also be carried out at this point, in order to calibrate the damper 13. The calibration procedure will be described in detail later. After the setting step 40, there is provided a check step 41 in order to check whether the vehicle has reached stable conditions. In the affirmative, the testing procedure can be continued. Otherwise, it is necessary to wait until stable conditions are reached.

The operations that have been described above define an initial part of the testing method that can be considered as a preliminary transient part in which substantially no load is applied to the transmission system 1. This initial part of the testing procedure is indicated by the letter A in FIG. 4.

Figure 4:
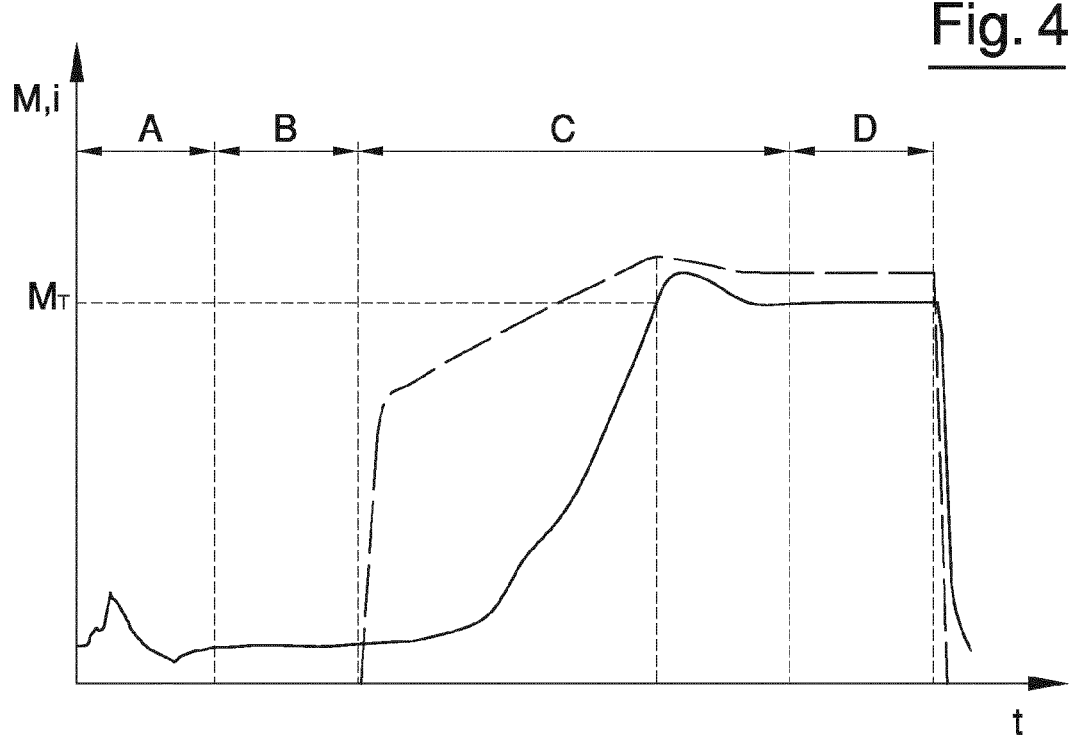
FIG. 4 is a graph showing how torque and clutch current vary during the steps of the method shown in FIGS. 2 and 3.

FIG. 4 shows with a continuous line how the torque M generated by the engine 2 and measured by the detector varies over time t. In the initial part A of the testing procedure, the torque M varies more or less randomly due to transient phenomena that occur in this phase.

When stable conditions are reached, a first measuring step 42 can take place, as will be explained in detail herebelow.

At this time, the clutch 21 is completely disengaged and the wheels are stationary. No load is applied to the transmission system 1. Therefore, the pressure difference Δp between pressure of the hydraulic fluid in the high-pressure line 9 (or 10) and pressure of the hydraulic fluid in the low-pressure line 10 (or 9) is very low.

In the first measuring step 42, the rotational speed $n_{HST0}$ of the output shaft 17 of the hydrostatic transmission is measured by means of the sensor 18. The rotational speed $n_{E0}$ of the engine shaft 4 is also recorded by means of the control device which controls the engine 2 and hence monitors the rotational speed thereof.

It is possible to record several values of $n_{HST0}$ and of $n_{E0}$ over a period of time, so that they can subsequently be averaged and processed.

The first measuring step 42 occurs during the period indicated by the letter B in FIG. 4. In this period, the torque M generated by the engine 2 is substantially constant. The period B can therefore be considered as a stable phase in which no load is applied to the transmission system 1.

After the first measuring step 42, the testing method comprises an intermediate step 43 in which an interaction with the clutch 21 is provided as will be set out below.

In the intermediate step 43, the clutch 21 is partially engaged, for example by sending a current i to a control element, particularly an electro-valve, which controls the clutch 21. The variation of the current i is shown with a dashed line in FIG. 4.

As the current i is increased, the clutch 21 starts to engage and the torque M increases. When the torque reaches a predefined value $M_T$, increase of the current i is stopped and the current i is caused to decrease to a limited extent. This implies that the clutch 21 is partially disengaged, without however being completely opened. Thereafter, the current i is kept constant.

In this step, the clutch 21 is engaged up to approximately 25-35% of its capacity. In other words, pressure of a hydraulic fluid that is sent to the clutch 21 in order to engage the latter does not exceed 25-35% of the pressure that the hydraulic fluid has when the clutch 21 is fully engaged.

Excessive stress on the components of the transmission system 1 during the testing method can thus be avoided. The torque M responds with a certain delay to the variations of the current i. Thus, when the current i starts decreasing, the torque M continues to increase for a while. Thereafter, also the torque M decreases slightly before stabilizing and remaining constant for a certain period.

As the torque M increases, also the pressure difference Δp between pressure of the hydraulic fluid in the high-pressure line 9 (or 10) and pressure of the hydraulic fluid in the low-pressure line 10 (or 9) increases.

The period in which the current i and the torque M increase and then slightly decrease before reaching a stable value is indicated by the letter C in FIG. 4.

This period can be considered as a transient phase in which a load is progressively applied to the transmission system 1. The load is due to the wheels 3 which, through the clutch 21, receive power from the engine 2 via the transmission system 1. The wheels 3 remain nevertheless still, since the vehicle is hand-braked.

Duration of period C is the result of a compromise between two opposite needs. On the one hand, period C should not be to long in order to avoid useless stress on the clutch 21. On the other hand, period C should not be too short in order to ensure that at its end stable conditions are reached.

As shown in FIG. 3, when the torque M is stabilized after engaging the clutch 21, a second measuring step 44 is provided in which several working parameters of the vehicle are measured.

In particular, the rotational speed $n_{HST}$ of the output shaft 17 is measured by means of the sensor 18. The rotational speed $n_E$ of the engine shaft 4 is also recorded by means of the control device which controls the engine 2. Also in this case, several values of the rotational speeds of the output shaft 17 and of the engine shaft 4 may be recorded and then processed to obtain an average value.

The rotational speeds of the output shaft 17 and of the engine shaft 4 measured in the second measuring step 44 (i.e., when a load is applied to the transmission system 1) are indicated respectively by $n_{HST}$ and $n_E$ to distinguish them from the values $n_{HST0}$ and $n_{E0}$ measured during the first measuring step 42, i.e. when no load was applied to the transmission system 1.

During the second measuring step 44, it is also possible to measure the value $M_D$ of the torque M at the damper 13 by means of the detector 20.

Furthermore, the value $M_E$ of the torque can also be recorded directly in the engine 2, by means of the control device which controls the engine 2.

The reason why $M_D$ and $M_E$ are recorded will be explained later.

The second measuring step 44 is carried out during the period indicated by the letter D in FIG. 4. This period can be considered as a stable phase in which a load is applied to the transmission system 1. As shown in FIG. 4, during the period D the torque M, as well as the current i, are substantially constant.

After the second measuring step 44 is concluded, the clutch 21 can be disengaged, so that both the torque M and the current i decrease.

The values that have been measured during the first measuring step 42 and during the second measuring step 44 can be processed as will be explained below.

In a calculating step 45, an actual value $Q_a$ of a parameter Q which is indicative of the volumetric efficiency $\eta_v$ of the hydrostatic unit 5 is calculated, particularly from the values of rotational speeds $n_{HST0}$, $n_{E0}$, $n_{HST}$, $n_E$.

In the embodiment that is being considered, the parameter Q is the ratio between the volumetric efficiency $\eta_v$ of the hydrostatic unit 5 determined when a load is applied and the volumetric efficiency $\eta_{v0}$ of the hydrostatic unit 5 when no load is present, i.e. when the clutch 21 is disengaged.

The general definition of volumetric efficiency $\eta_v$ of a hydrostatic transmission is given below:

$$\eta_v = \frac{n_{HM} \cdot V_{HM}}{n_{HP} \cdot V_{HP}}$$

wherein:

$n_{HM}$ is the rotational speed of the hydraulic motor of the hydrostatic unit (output speed);
$V_{HM}$ is the absorption volume of the hydraulic motor;
$n_{HP}$ is the rotational speed of the hydraulic pump of the hydrostatic unit (input speed);
$V_{HP}$ is the displacement volume of the hydraulic pump.

In the exemplary embodiment discussed herein, the absorption volume of the hydraulic motor is constant, whereas the displacement volume of the hydraulic pump is variable and can be expressed as follows:

$$V_{HP} = \alpha \cdot V_{HPMAX}$$

where $V_{HPMAX}$ is the maximum displacement volume that the hydraulic pump may have and $\alpha$ has been previously defined as the ratio between the current value of the swivel angle of the swash plate in the hydraulic pump and the maximum possible value of the swivel angle.

In the case at issue, the rotational speed $n_{HM}$ of the hydraulic motor is the rotational speed of the output shaft 17 as measured by the sensor 18, i.e. the speed which has previously been called $n_{HST}$ or $n_{HST0}$, depending on whether a load was applied or not to the transmission system 1.

The rotational speed $n_{HP}$ of the hydraulic pump is proportional to the rotational speed of the engine shaft as recorded by the control device of the engine 2, through a coefficient which depends on the features of the transmission elements interposed between the hydraulic pump 6 and the engine 2. For a given geometry and layout of these transmission elements, the coefficient is constant and can be calculated. In other words, $n_{HP}$ is proportional to the rotational speed that has previously been designated as $n_E$ or $n_{E0}$, depending on whether a load was applied or not to the transmission system 1.

The actual value $Q_a$ of parameter Q, which is indicative of the volumetric efficiency of the hydrostatic transmission, can therefore be calculated as follows:

$$Q_a = \frac{\eta_V}{\eta_{V0}} = \frac{n_{HST} \cdot n_{E0}}{n_{HST0} \cdot n_E}$$

The rotational speeds of the output shaft 17 have been determined respectively in the first measuring step 42 ($n_{HST0}$) and in the second measuring step 44 ($n_{HST}$). Similarly, the rotational speeds of the engine shaft 4 have been determined respectively in the first measuring step 42 ($n_{E0}$) and in the second measuring step 44 ($n_E$). Hence, at this point of the testing procedure, the actual value $Q_a$ can be easily calculated.

The actual value $Q_a$ can be calculated by using only measures of rotational speeds of components of the transmission system 1, particularly the output shaft 17 and the engine shaft 4. These measures can be taken in a simple way and by means of sensors or detectors that are not particularly complicated or expensive. Hence, calculating the actual value $Q_a$ does not involve particular difficulties.

However, the actual value $Q_a$ of the parameter Q, if taken alone, does not allow an operator to assess whether the hydrostatic unit 5 is working properly or not. This is because the parameter Q depends on the working conditions of the hydrostatic unit 5, and particularly on the pressure difference $\Delta p$ between pressure of the hydraulic fluid in the high-pressure line 9 (or 10) and pressure of the hydraulic fluid in the low-pressure line (or 9).

Figure 5:
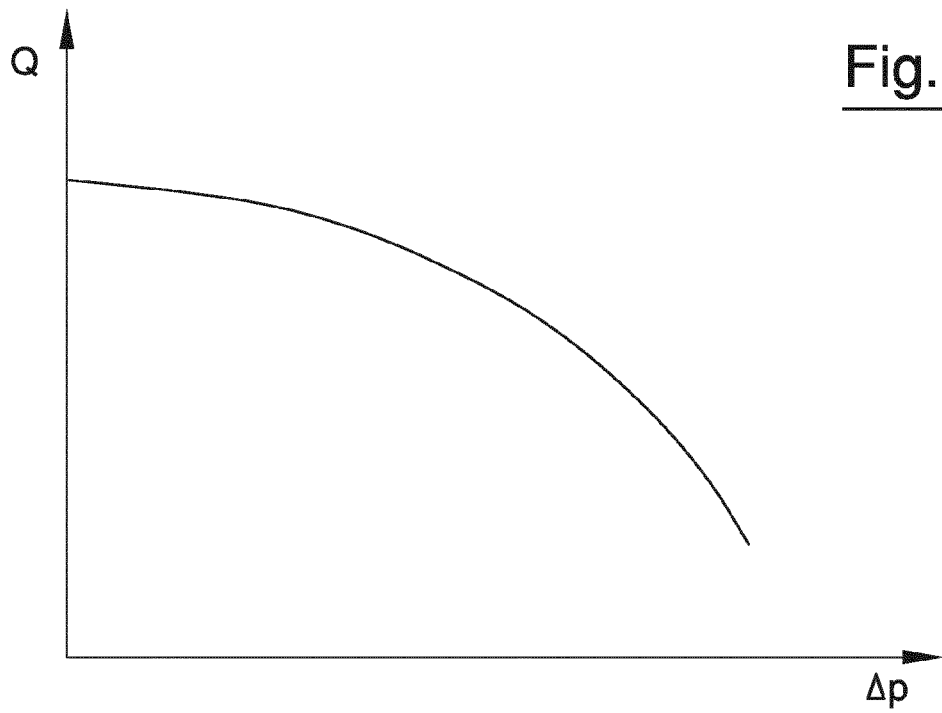
FIG. 5 is a graph showing schematically the variation of a parameter indicative of the volumetric efficiency of the hydrostatic transmission.

As shown in FIG. 5, the parameter Q generally decreases as the pressure difference $\Delta p$ increases. Thus, a value of the parameter Q which is optimal for certain working conditions, and particularly for a given pressure difference $\Delta p$, could be problematic in different working conditions, i.e. for a different pressure difference $\Delta p$.

To be precise, the parameter Q may depend also on other factors which may change as the working conditions of the hydrostatic unit 5 change. These factors are, for example, the parameter $\alpha$ and the temperature of the hydraulic fluid flowing in the hydrostatic transmission. However, the parameter $\alpha$ has been set to a desired value in the initial setting step and is kept constant throughout the whole testing method. The testing method can be carried out in a temperature range in which the temperature of the hydraulic fluid has substantially no influence on the parameter Q.

Hence, the parameter Q may be considered as being influenced mainly by the pressure difference Δp.

The pressure difference Δp can be calculated once the features of the transmitting elements interposed between the engine 2 and the hydrostatic unit 5 are known, particularly once the features of the planetary gearing 22 are known.

It has been found that, in the configuration in which the testing method is carried out, the following relation exists between the pressure difference Δp and the torque M generated by the engine 2:

$$\Delta p = k \cdot M$$

In other words, the pressure difference Δp is proportional to the torque M through a coefficient k.

This relation has been calculated mathematically and also experimentally confirmed by measuring both the pressure difference Δp and the torque M.

Therefore, starting from the value $M_D$ of the torque as measured during the second measuring step 44 at the damper 13, it is possible to calculate a specific pressure difference $\Delta p_D$ in the hydrostatic unit 5.

In order to assess whether the actual value $Q_a$ of parameter Q corresponds to a properly working hydrostatic unit, at least one expected value of the parameter Q is determined in a determining step 46. The manner in which this can be done will be explained below.

One or more reference vehicles, of the same kind as the tested vehicle, have been previously tested in the same working conditions as those followed in the above disclosed testing procedure. The reference vehicles had transmission units which worked perfectly. The parameter Q has been calculated for the reference vehicles for a very high number of values of pressure difference Δp. In other words, a precise mapping of the parameter Q as a function of the pressure difference Δp (and hence as a function of the torque M, which is related to the pressure difference Δp as discussed above) has been carried out for the reference vehicles.

A table has thus been obtained which, for any selected value of the torque M, allows the corresponding value of the parameter Q to be determined in the case of a perfectly working hydrostatic unit. This table is stored in a control unit of the vehicle to be tested.

Starting from the value of the torque $M_D$ which has been recorded in the second measuring step 44 by the detector at the damper 13, the control unit therefore determines, on the basis of the table derived from the reference vehicles, the expected value of the parameter Q, that will be indicated as $Q_{ED}$ in the following. The expected value $Q_{ED}$ is the value that the parameter Q should have if the hydrostatic unit 5 of the tested vehicle worked as the hydrostatic units of the reference vehicles.

The actual value $Q_a$ of the parameter Q calculated for the vehicle under test and the expected value $Q_{ED}$ can be further processed in order to assess whether the hydrostatic unit 5 of the vehicle under test is properly working.

For example, the actual value $Q_a$ and the expected value $Q_{ED}$ can be displayed so that an operator can evaluate how the hydrostatic unit 5 is working, in a displaying step 47. It is also possible to compare automatically the actual value $Q_a$ with the expected value $Q_{ED}$ and generate a message which informs the user about the status of the hydrostatic unit 5.

For example, if the actual value $Q_a$ is 0.950 and the expected value $Q_{ED}$ is 0.975, the operator can immediately see that the hydrostatic unit 5 has a volumetric efficiency which is roughly lower than the volumetric efficiency of the reference vehicles by 2.5%.

Thus, the hydrostatic unit 5 can be tested while it is still assembled on the vehicle and can be dismounted from the vehicle only if the testing procedure shows that the hydrostatic unit 5 has an abnormally low volumetric efficiency.

If, on the other hand, the testing procedure shows that the hydrostatic unit 5 has a volumetric efficiency—or more precisely, a value of a parameter which is indicative of the volumetric efficiency—sufficiently close to the reference vehicles, than the hydrostatic unit 5 does not need to be replaced and the fault is to be searched for in a different component.

It is also possible—either in addition to $Q_{ED}$ or as an alternative—to determine the expected value of the parameter Q starting from the torque $M_E$ recorded in the second measuring step 44 by the control device which controls the engine 2, i.e. upstream of the damper 13. This expected value will be indicated as $Q_{EE}$ and is determined by inputting the torque $M_E$ into the table predisposed on the basis of the reference vehicles.

By calculating the expected value $Q_{ED}$ based on the engine torque $M_E$, additional information on the transmission system 1 can be obtained.

For example, the following situation may occur:

$Q_a$=0.950 (actual value for the tested vehicle)

$Q_{ED}$=0.975 (expected value based on the torque at the damper 13)

$Q_{EE}$=0.975 (expected value based on the torque in the engine 2)

In this case, the operator can infer that the detector 20 is well calibrated, because the two expected values of the parameter indicative of volumetric efficiency do not differ substantially from one another.

The low actual value $Q_a$ really corresponds to a low volumetric efficiency of the hydrostatic unit.

Another example can be the following:

$Q_a$=0.950 (actual value for the tested vehicle)

$Q_{ED}$=0.975 (expected value based on the torque at the damper 13)

$Q_{EE}$=0.950 (expected value based on the torque in the engine 2)

In this case, the detector 20 is not well calibrated, because the two expected values of the parameter indicative of volumetric efficiency are substantially different from one another.

The hydrostatic unit 5 is probably working properly, because the actual value $Q_a$ corresponds to the expected value $Q_{EE}$ based on the torque in the engine. However, the vehicle has probably a transmission with anomalous losses, due to the high expected value $Q_{ED}$ based on the torque at the damper 13.

In any case, precious information can be obtained without disassembling the hydrostatic unit 5 unless this is truly necessary, which allows considerable savings in time and costs.

As mentioned before, a calibration procedure can be provided at the beginning of the testing method for calibrating the detector 20 located at the damper 13, so that the same mechanical losses are detected both for the tested vehicle and for one or more reference vehicles. These mechanical losses are due to the planetary gearing 22, the other toothed wheels, the pumps and more in general the mechanical components of the transmission system 1, which unavoidably has a mechanical efficiency lower than 1.

The detector 20 can be so configured as to read the value of a phase angle φ at the damper 13. The phase angle φ corresponds to the phase difference between the angular speed of the engine shaft 4 upstream of the damper 13 and the angular speed of the main shaft 12 downstream of the damper 13.

By measuring the phase angle φ, the torque at the damper can be determined on the basis of a characteristic curve that, for each damper, gives the relationship between the phase angle φ and the torque.

The calibration step is carried out while the engine 2 is running, the clutch 21 is open and the vehicle is still. In this condition, the torque generated by the engine 2 is indicative of the mechanical losses of the transmission system 1, because no external device to be powered is attached to the power take-off of the vehicle.

In the calibration step, the behaviour of the tested damper 13 is compared to the behaviour of a damper of a reference vehicle.

For each kind of damper, a characteristic curve is known and is provided to the user by the damper manufacturer. This characteristic curve is shown by a continuous line in FIG. 6, which shows how the torque $M_D$ varies as a function of the phase angle φ.

Figure 6:
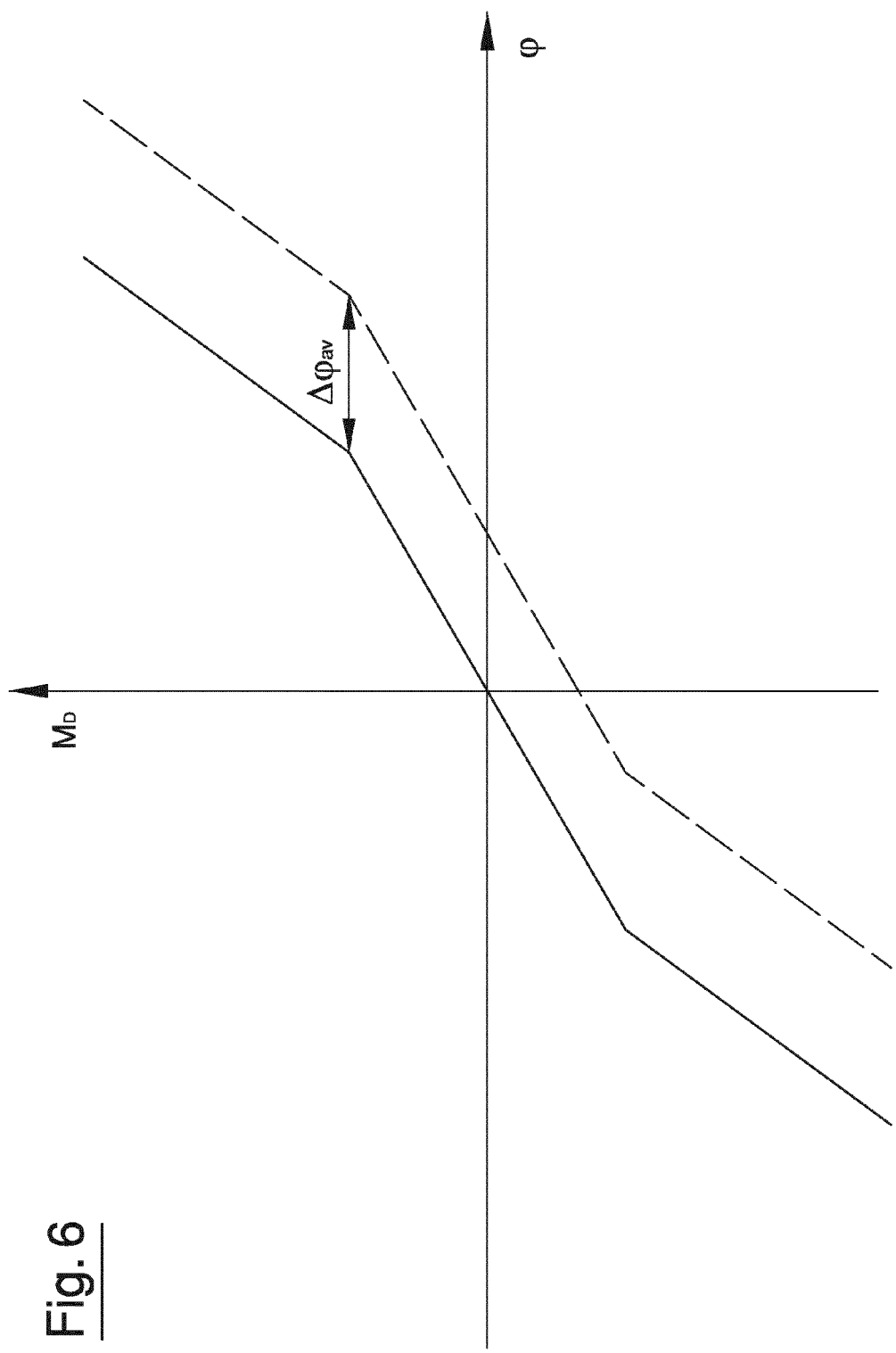
FIG. 6 is a phase angle-torque characteristic of a damper, for a reference damper (solid lines) and a damper which is being tested (dotted lines).

The dashed line of FIG. 6 shows, on the other hand, the characteristic curve of the tested damper, which is shifted with respect to the characteristic curve provided by the damper manufacturer by an offset $\Delta\phi_{av}$ that will be calculated as explained below.

For the purposes of the calibration step, it is assumed that each transmission system 1 has the same mechanical losses for a given temperature.

The behaviour of the damper to be calibrated is studied at different positions of the swash plate of the hydraulic pump 6. In other words, the behaviour of the damper to be calibrated is studied for different values of the parameter α, i.e. the ratio between the current value of the swivel angle of the hydraulic pump 6 and the maximum possible value of the swivel angle.

By varying the position of the swash plate, it is possible to obtain different losses in the hydrostatic unit 5. These losses originate different loads applied at the side of the damper 13 opposite the engine 2, i.e. different torques.

Typically, the losses obtained in the hydrostatic unit 5 by varying the position of the swash plate are of the order of 30-40 N·m. These losses are high enough to enable phase differences to be detected at the sides of the damper 13, without however having to engage the clutch 21. Hence, the clutch 21 is not stressed while the damper 13 is calibrated. Furthermore, the torque generated by the engine 2 in this step is very low. Substantially no wear is thus created on the transmission system 1.

In order to improve calibration accuracy, the behaviour of the damper 13 to be calibrated can be considered at a plurality of rotational speeds of the engine 2.

For example, five different values of the parameter α and three different values of the rotational speed of the engine shaft 4 can be taken into consideration. In this case, the behaviour of the damper 13 is studied at fifteen different calibration points $P_i$, corresponding to the five values of the parameter α for each value of the rotational speed.

Each calibration point $P_i$ defines a working condition of the transmission system 1.

For each calibration point $P_i$, the phase angle $\phi_i$ of the damper 13 is recorded.

For each calibration point $P_i$, it is known from the characteristic curve provided by the damper manufacturer which expected value $\phi_{ei}$ of the phase angle should be obtained.

To be precise, for each calibration point $P_i$, a respective expected torque $M_{EDi}$ should be theoretically obtained at the damper 13. The expected torque $M_{EDi}$ can be derived from a table completed after studying one or more reference, well working vehicles. By inputting the expected torque $M_{EDi}$ in the characteristic curve of the damper, as supplied by the damper manufacturer, the corresponding expected phase angle $\phi_{ei}$ can be found out. However, for simplifying the procedure, it is possible to establish a direct relationship, for example by means of a suitable table or graph, between each working point $P_i$ and the corresponding expected value $\phi_{ei}$ of the phase angle.

In any case, for each calibration point $P_i$, it is possible to determine the difference or offset $\Delta\phi_i$ between the recorded phase angle $\phi_i$ of the damper to be calibrated and the expected phase angle $\phi_{ei}$.

An average offset $\Delta\phi_{av}$ can be calculated by averaging the single offsets $\Delta\phi_i$ determined for each calibration point $P_i$. The average offset $\Delta\phi_{av}$ can be used to calibrate the detector 20 associated to the damper 13 by instructing the control unit to consider each measured value $\phi_m$ of the phase angle as if it were $\phi_m - \Delta\phi_{av}$ and use the resulting phase angle to calculate the torque on the basis of the characteristic curve of the damper.

In this way, the torque detected at the damper 13 of the tested vehicle, for a given combination of rotational speed and α, will be the same as the torque detected by the damper of the reference vehicle, for that given combination of rotational speed and α. In other words, the losses of the transmission system 1 of the tested vehicle will be the same as the losses of the transmission system of the reference vehicle.

In an alternative embodiment, a temperature compensation can be adopted in the calibration procedure to take into consideration the effects of temperature of the hydraulic fluid, particularly oil, circulating in the hydrostatic unit 5. To this end, a temperature correction factor $F_{TC}$ can be added to each recorded phase angle $\phi_i$ before determining the offset $\Delta\phi_i$.

In conclusion, the testing method shown in FIGS. 2 and 3 can be carried out fully automatically in order to determine, in few minutes, whether the hydrostatic unit 5 installed on the vehicle is properly working or not.

The calibration procedure can also be performed quickly and automatically, so as to increase precision of the test results.

However, the calibration procedure could also be carried out independently of the test method shown in FIGS. 2 and 3, each time the detector 20 associated to the damper 13 needs to be calibrated for whatsoever purpose.

The invention claimed is:

1. A method for testing a hydrostatic transmission of a vehicle, the hydrostatic transmission comprising a hydrostatic unit installed on the vehicle, the method comprising the following steps:

calculating an actual value ($Q_a$) of a parameter (Q) which is indicative of the volumetric efficiency of the hydrostatic unit, in a working condition, wherein the parameter (Q) is the ratio between a value ($\eta_v$) of the volumetric efficiency of the hydrostatic unit determined when a clutch of the vehicle is at least partially engaged and a further value ($\eta_{v0}$) of the volumetric efficiency of the hydrostatic unit determined when the clutch is disengaged, wherein the further value ($\eta_{v0}$) is determined from the rotational speeds ($n_{E0}$; $n_{HST0}$) respectively of a first component associated with an input of the hydrostatic unit and of a second component associated with an output of the hydrostatic unit, measured during a first measuring step in which the vehicle is stationary and its clutch is disengaged, and wherein the value ($\eta_v$) is determined from the rotational speeds ($n_E$; $n_{HST}$) of the first component and of the second component, measured during a second measuring step in which the clutch is at least partially engaged; and determining an expected value ($Q_{ED}$; $Q_{EE}$) of the parameter (Q) in the working condition, the actual value ($Q_a$) being comparable with the expected value ($Q_{ED}$; $Q_{EE}$) in order to evaluate how the hydrostatic unit is working.

2. A method according to claim 1, wherein the actual value ($Q_a$) of the parameter (Q) is calculated by multiplying the ratio ($n_{E0}/n_{HST0}$) between the rotational speed of the first component and the rotational speed of the second component, detected in the first measuring step, by the ratio ($n_{HST}/n_E$) between the rotational speed of the second component and the rotational speed of the first component, detected in the second measuring step.

3. A method according to claim 2, wherein the hydrostatic unit comprises a variable displacement hydraulic pump for driving a hydraulic motor, the hydraulic pump having a swash plate that can be positioned at selectable swivel angles, an engine being provided for driving the hydraulic pump, the engine being connected to the hydrostatic transmission by a damper.

4. A method according to claim 3, wherein the first component is an output shaft of the hydraulic motor and the second component is a shaft of the engine.

5. A method according to claim 3, wherein the step of determining the expected value ($Q_{ED}$; $Q_{EE}$) of the parameter (Q) comprises a step of measuring a torque ($M_D$, $M_E$) generated by the engine.

6. A method according to claim 5, wherein a planet gearing is interposed between the hydrostatic unit and the engine, so that the torque ($M_D$, $M_E$) is proportional to a pressure difference (p) between a high-pressure line of the hydrostatic unit and a low-pressure line of the hydrostatic unit.

7. A method according to claim 5, wherein the torque ($M_D$, $M_E$) is measured in the second measuring step.

8. A method according to claim 5, wherein the step of determining the expected value ($Q_{ED}$; $Q_{EE}$) of the parameter comprises finding out a stored value ($Q_{ED}$; $Q_{EE}$) of the parameter which was determined for one or more reference vehicles at the torque ($M_D$, $M_E$).

9. A method according to claim 5, wherein the torque ($M_D$) is measured at the damper.

10. A method according to claim 5, wherein the torque ($M_E$) is measured internally of the engine.

11. A method according to claim 3, wherein the swash plate of the hydraulic pump is kept at its maximum swivel angle while values ($n_{HST0}$, $n_{E0}$, $n_{HST}$, $n_E$) required to calculate the actual value (Q) of the parameter are measured.

12. A method according to claim 1, further comprising providing a control unit for the vehicle, the control unit being programmed for carrying out the method.

13. A method according to claim 1, further comprising providing a computer program product for use in the vehicle, which program product is operative to cause a processor to perform the method.

* * * * *